No. 766,651. PATENTED AUG. 2, 1904.
L. F. ADT.
EYEGLASSES.
APPLICATION FILED JULY 31, 1903.
NO MODEL.

Witnesses. Inventor.

No. 766,651.   Patented August 2, 1904.

UNITED STATES PATENT OFFICE.

LEO F. ADT, OF TROY, NEW YORK.

EYEGLASSES.

SPECIFICATION forming part of Letters Patent No. 766,651, dated August 2, 1904.

Application filed July 31, 1903. Serial No. 167,723. (No model.)

*To all whom it may concern:*

Be it known that I, LEO F. ADT, of Troy, in the county of Rensselaer and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My invention relates to eyeglasses, and has for its objects to provide a bridge-spring to which the lenses are connected and are adapted to be moved in approximately a horizontal plane or one perpendicular to the plane of the lenses, so that the guards attached to the lenses may be separated by bending the outer ends of the lenses forwardly; and to this end it consists of a bridge-spring connected to the lenses and having yielding portions and limiting devices or guides which insure the motion in a horizontal plane and permit the requisite movements with the least injurious strain upon the metal.

Other features of novelty and advantage will be hereinafter more fully explained and pointed out in the claims hereunto annexed.

Figure 1:
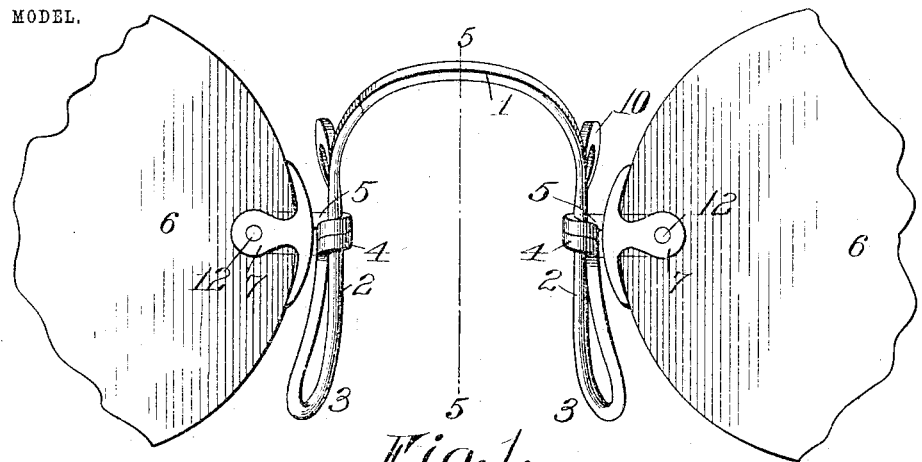
Figure 2:
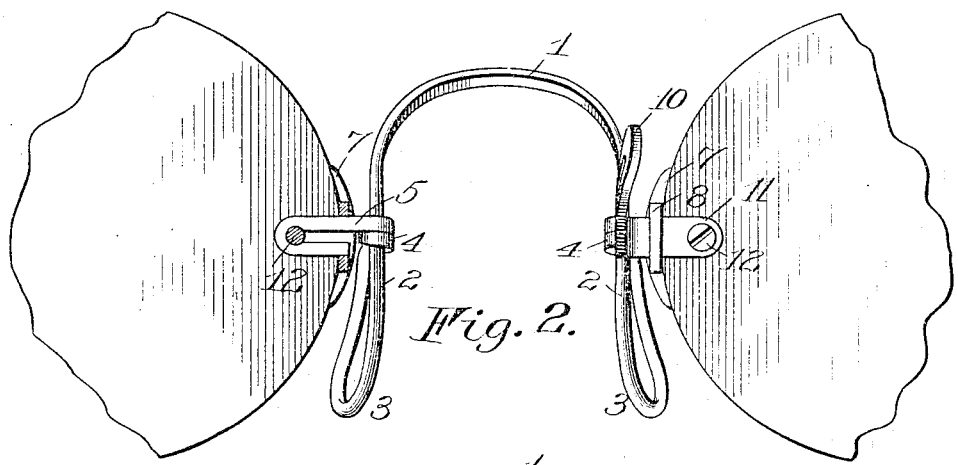
Figure 3:
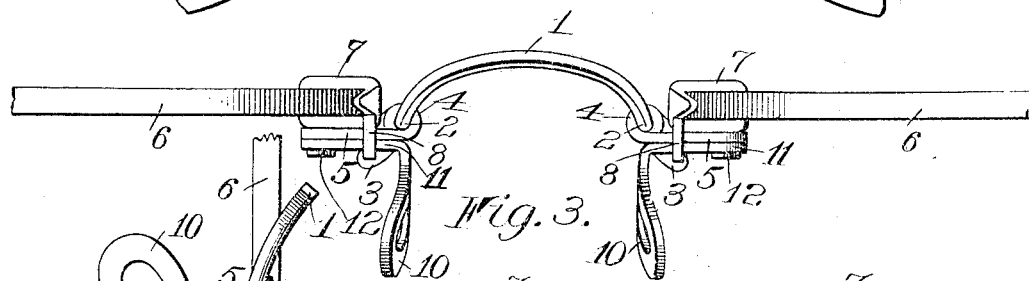
Figures 4, 5:
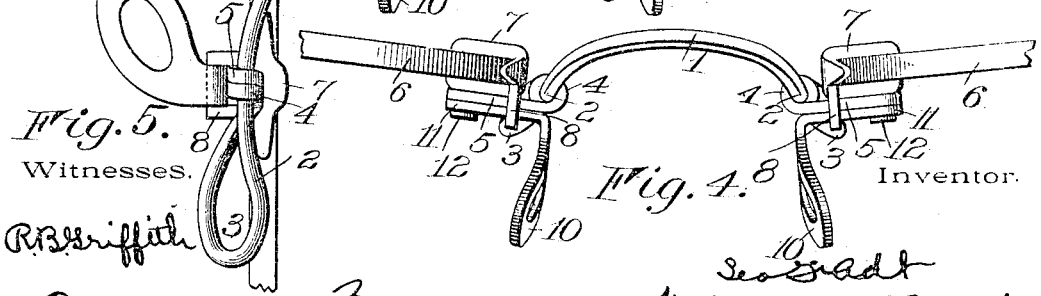

In the drawings, Figure 1 is a front elevation of a device embodying my said invention. Fig. 2 is a rear view of the same, one of the guards being omitted. Fig. 3 is a plan view showing the relation of the parts when in their normal position. Fig. 4 is a similar view showing the lenses open; and Fig. 5 is a sectional view on the line 5 5, Fig. 1, looking toward the left.

The same reference-numerals in the several figures designate similar parts.

To facilitate an understanding of my said invention, reference will be had to the herein-shown embodiment, wherein 1 designates the bridge-spring, preferably arched centrally to conform to the contour of the nose and adapted to rest thereon and having the downwardly-extending arms 2 2, curving slightly outwardly and bending rearwardly and upwardly to form loops 3 3, thence turning about the arms 2 2 to form coils 4 4, the free ends of which extend outwardly and double back upon themselves to form attaching-arms 5 5. To the lenses 6 6 are secured attaching devices or clips 7 7, the devices shown in the present embodiment having laterally-disposed perforated lugs 8 8, through which are passed the attaching-arms 5 5 of the bridge-spring. Nose-guards of any suitable character may also be employed, and the form herein shown comprises a nose-clamp 10, having a shank 11, passing through the perforated lug 8 of the clip 7, the parts being secured to the lenses by screws 12 12; but it will be understood that any desired form of guard may be employed and that any suitable means may be adopted for attaching the bridge-spring to the lenses, as I do not limit myself to the precise form shown.

In employing a bridge-spring of the character above described it will be observed that motion of the lenses and of the guards attached to them will be about the coils 4 4 as approximate centers, and with the guards arranged directly in rear of said coils a maximum outward or separating motion thereof is secured. As the extreme ends of the bridge-spring are attached to the lenses and are moved with them, a torsional or twisting stress is produced upon the loops 3 3, the reaction of which will tend to return the lenses to their normal position and in so doing will bring the guards together to produce a pressure upon the nose when interposed between them.

It will be obvious to those skilled in the art that an eyeglass constructed in accordance with my invention enables the utmost simplicity and facility in construction and that such a device may be readily adjusted and removed from the nose of the wearer.

By bending the loops 3 3 outwardly with the proper curvature to bear upon the nose and arching the central portion of the bridge-spring to conform to the contour of the upper portion of the nose it will be observed that a firm seating of the eyeglass is secured by the extensive bearing-surfaces provided.

In the present embodiment of my invention a spring is employed, the central portion of which is so formed as to resist forces tending to bend it in a horizontal plane, and as the vertically-extending portions pass through the coils and guide or steady the latter the movement of the lenses will be about the vertically - extending portions as approximate centers. The free ends of the coils are attached to the lenses and the opposite ends continued form the loops attached to the central portion of the spring, and motion of the lenses about their pivots in a horizontal plane will exert not only a torsional stress upon said loops, but to some extent a contraction of the coils, the reaction of which will tend to proximate the guards. It will be understood that the resiliency of different portions of said spring may be varied to any desired degree to produce the desired results—that is to say, the principal resiliency may be in the coils or in the loops; but although I prefer to form the guide which might be called the "pivots" for the lenses in the coils 4 4, which are integral with the bridge, this is not absolutely essential as long as the fixed pivotal points are connected to the lenses and the spring is provided with yielding portions, so that in turning the lenses to open the guards a torsional strain, as in the loops 3, or a bending strain, as in the coils, will be brought upon the spring portions while the lenses and guards move in approximately a horizontal plane.

I claim as my invention—

1. The combination with the lenses, of a bridge-spring attached to the lenses and extending around the bridge to form pivotal points for said lenses, and loops formed between the attached and central portions of the spring, whereby a torsional stress will be exerted upon said loops when the lenses are moved about their pivotal points.

2. The combination with the lenses, of a bridge-spring having loops formed therein, the free ends of which are passed around the bridge at points intermediate said loops and the central portion of the bridge, and then attached to the lenses, and guards attached to the lenses and moving about said intermediate points as approximate centers.

3. The combination with the lenses, of a bridge-spring having resilient loops formed therein, the free ends of which are extended around the bridge and attached to the lenses, to form relatively fixed pivotal points about which said lenses move as approximate centers, and guards attached to said lenses.

4. The combination with the lenses, of a relatively elastic bridge having its extremities attached to the lenses and coiled about said bridge at intermediate points to provide approximate centers about which said lenses move, loop portions formed between said intermediate points and the attached ends of the bridge, and guards attached to said lenses.

5. The combination with the lenses, of a bridge-spring having its ends doubled to form loops and coiled about intermediate portions of said spring and attached to the lenses to form pivots about which said lenses move, and guards attached to the said lenses.

6. The combination with the lenses, of a bridge-spring having its ends extending downwardly and doubled upwardly to form loops, the free ends of which are coiled about said bridge at intermediate points and attached to the lenses, and guards attached to said lenses.

7. The combination with the lenses and bearings rigid therewith, of a bridge having portions journaled to turn in the bearings on the lenses and having yielding portions beyond said bearings connected to the lenses and nose-guards connected to the lenses.

8. The combination with the lenses, of the spring connected at its ends to the lenses and having the bent or doubled portions forming loops and separate pivotal connections between the lenses and the spring, said pivots being rigid with the lenses.

9. The combination with the lenses, of the spring connected at its ends to the lenses having the bent or doubled portions intermediate the central portion and the attaching ends, and fixed pivotal connections between the lenses and the spring located between the loops and the central portion of the spring.

10. The combination with the lenses, of the spring connected at its ends to the lenses and having the horizontal coiled portions intermediate the central portion and the point of attachment to the lenses, vertical guides extending through the coils and nose-guards connected to the lenses.

LEO F. ADT.

Witnesses:
EDWARD MURPHY, 2d,
MICHAEL F. O'CONNOR.